Aug. 15, 1933.   H. A. ELWELL   1,922,475
AUTOMOBILE JACK
Filed April 6, 1932   2 Sheets-Sheet 1
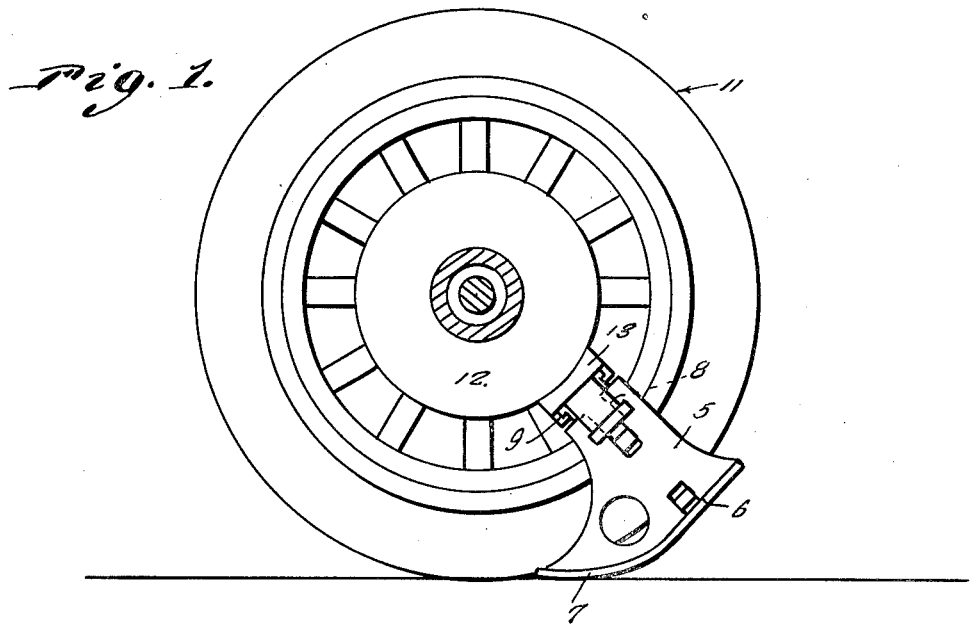
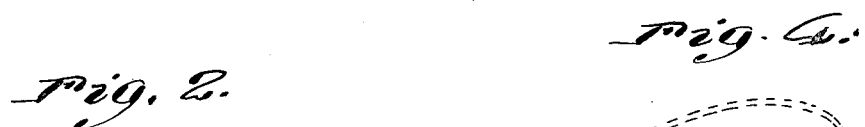
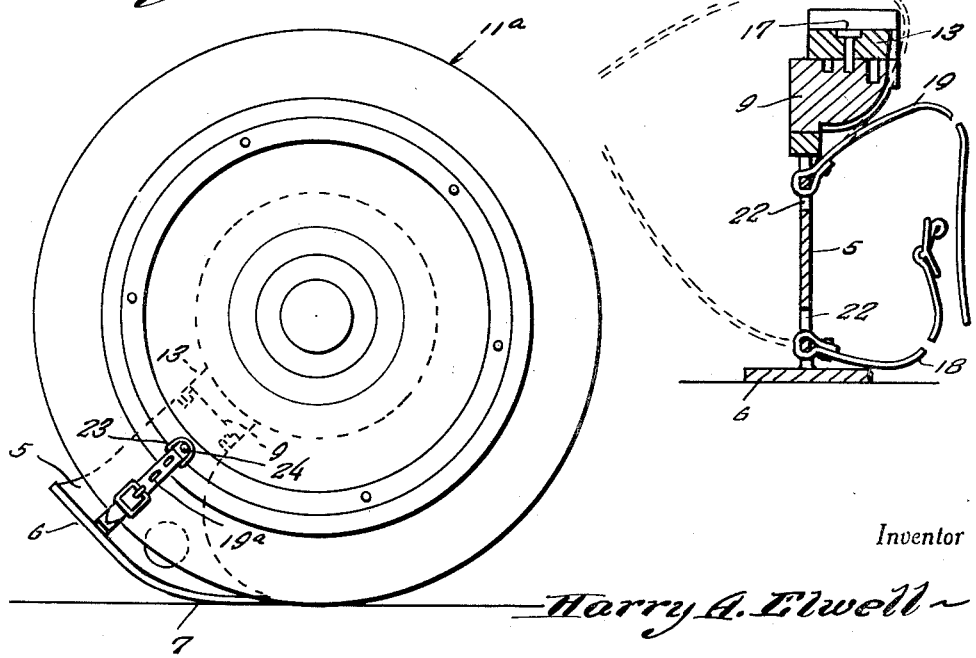
Inventor
*Harry A. Elwell*
By *Clarence A. O'Brien*
Attorney

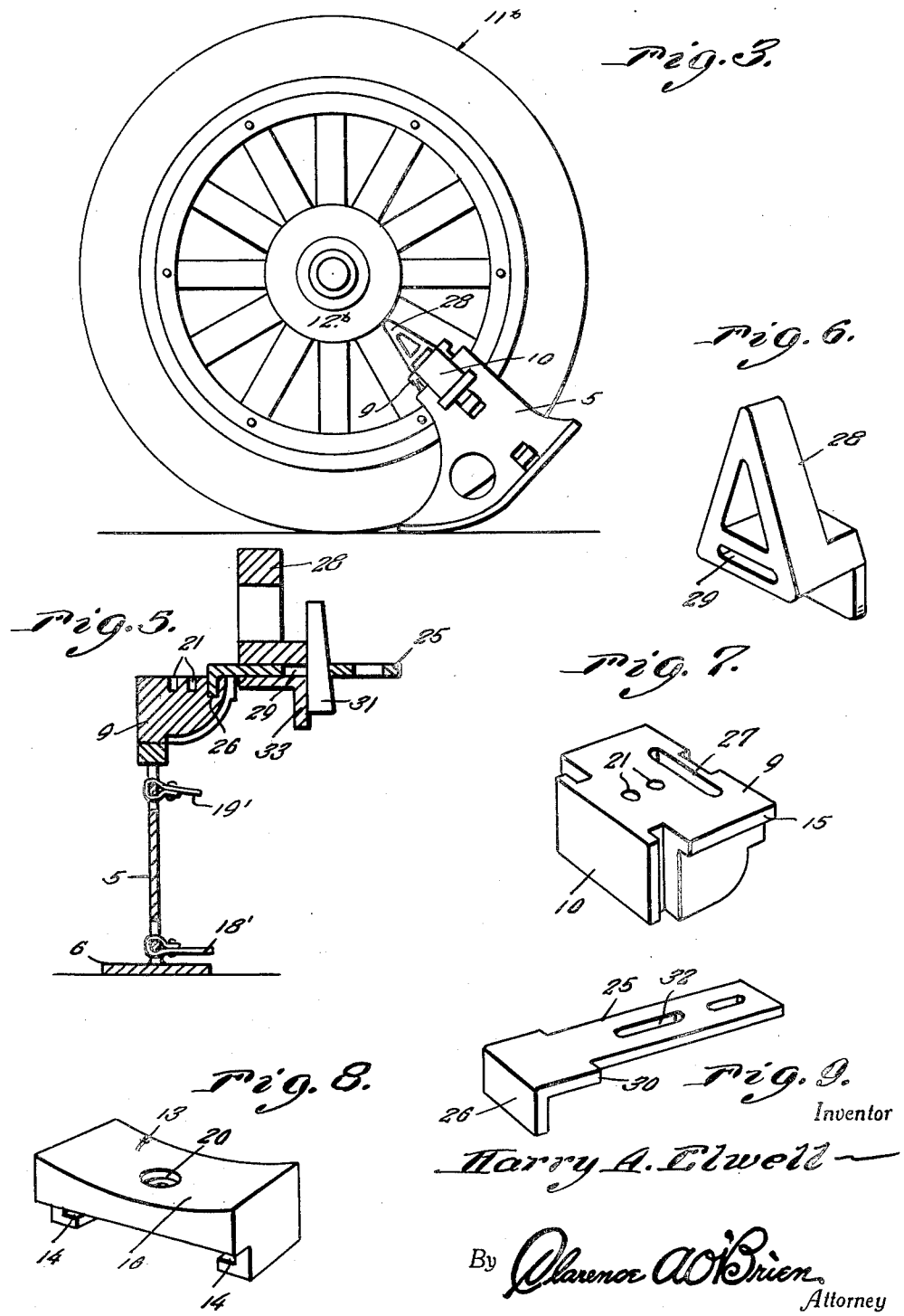

Patented Aug. 15, 1933

1,922,475

UNITED STATES PATENT OFFICE 1,922,475

AUTOMOBILE JACK

Harry A. Elwell, Danville, Ill.

Application April 6, 1932. Serial No. 603,658

5 Claims. (Cl. 254—94)

This invention relates to automobile jacks of the type adapted to utilize movement of the vehicle for raising one or more of the vehicle wheels to permit the placing of a skid chain on the tire of the vehicle wheel.

While the jack of the present invention is especially designated for use in lifting the vehicle wheel for the purpose of placing or removing a tire chain it is to be understood that I do not wish to limit myself to this particular use of the jack since in actual practice other uses than that mentioned will readily present themselves.

The invention together with its numerous objects and advantages will be best understood from a study of the following description, taken in connection with the accompanying drawings wherein:

Figure 1 is a side elevational view of a form of jack embodying the features of the present invention and especially designed for use with wooden wheels having internal brakes.

Figure 2 is a view similar to Figure 1 of a jack especially designed for use with a disk wheel.

Figure 3 is a side elevational view of a jack especially designed for use with a spoke wheel having an external brake associated therewith.

Figure 4 is a sectional elevational view through that form of jack shown in Figure 1.

Figure 5 is a sectional elevational view through that form of jack shown in Figure 3.

Figure 6 is a perspective view of a lug for use with the jack when the latter is employed for raising a wheel having an external brake associated therewith.

Figure 7 is a perspective view of the jack head.

Figure 8 is a perspective view of a lug for use with the jack when the latter is used for lifting either a disk wheel or a spoke wheel, the latter having an internal brake associated therewith.

Figure 9 is a perspective view of a supporting arm for the lug shown in Figure 6.

With reference more in detail to the drawings it will be seen that my improved jack comprises a web 5 having a flange at its periphery, one part 6 of the flange being straight, flat, and at right angles to the web, with the other part of the flange being arcuately curved as at 7.

At its upper or free end the web 5 is provided with a slot 8 and a jack head 9 is provided on one side thereof with a T-shaped lug 10 adapted to engage the slot 8 for securing the head 9 on the web at right angles thereto.

The top face of the head 9 is flat, and when the jack is to be used for lifting a spoke wheel 11 provided with an internal brake 12, a load-engaging lug 13 is used, and the lug 13 is provided on its under side with depending flanges provided with grooves 14 to engage transverse ribs 15 provided at relatively opposite ends of the head 9 to retain the lug 13 on the head 9 against endwise movement. The top side or face of the lug 13 is concaved as at 16 and is adapted to conformably engage the periphery of the drum of the brake 12 as shown in Figure 1.

To retain the lug 13 against lateral movement relative to the head 9, a pin 17 is provided and the same is adapted to pass through a countersunk opening 20 provided in the lug 13 and engage in a socket 21 provided in the head 9. (See Figure 4).

To secure the jack fast to the wheel straps 18 and 19 are provided and the web 5 is provided with upper and lower pairs of slots 22 to facilitate anchoring one end of the straps 18 and 19 to the web shown in Figure 4. From the invention thus far described, it will be seen that in using the jack to lift the wheel 11 the jack is disposed at the inner side of the wheel and positioned as suggested in Figure 1 with the straps 18 and 19 passing to the outboard side of the wheel and the end of strap section 19 engaged with the buckle provided on strap 18. The seat or face 16 of the lug 13 is of course engaged with the periphery of the brake drum of brake 12, and with the jack positioned in Figure 1, it will be apparent that upon movement of the vehicle toward the right in Figure 1 the flat portion 6 of the flange will move into contact with the ground effecting a raising of the wheel 11, whereupon the tire chain may be readily placed on the tire of the wheel or removed therefrom; or the tire may be removed or placed on the wheel, or other work completed as may be required.

The use of the jack for raising the disk wheel 11a is substantially the same as that described with respect to the use of the jack with the wheel 11, the only difference being in the manner of securing the jack to the wheel. As shown in Figure 2 instead of using the strap section 19 a strap section 19a is employed and the same has one end thereof engaged with the buckle of the strap section 18 while the other end of the strap section 19a is provided with a ring 23 engaging a stud 24 provided on the outboard side of the disk wheel 11a as shown in Figure 2.

To use the jack for raising a spoke wheel 11b provided with an external brake 12b, the lug 13 is dispensed with and in lieu thereof there is used a bracket plate or arm 25 that at one end is provided with a downturned flange or lug 26 adapted to engage in a pocket or recess 27 provided therefor in the jack head 9. A triangular shaped load-engaging lug 28 has a base portion provided with an opening 29 therethrough and through which the arm or plate 25 extends. The lug 28 is clamped on the arm 25 between oppositely extending shoulders 30 provided on the arm and a wedge key 31 insertable through a slot 32 provided in the arm 25 as suggested in Figure 5. The base of the lug 28 at the under side of the opening 29 is provided with a depending flange 33 for engaging one side of the largest end of key 31.

When the parts are assembled as shown in Figure 5 the arm 25 is passed through adjacent spokes of the vehicle with the jack disposed to the outboard side of the wheel, the jack being made fast to the wheel through the medium of straps 18′, 19′ in substantially the same manner as that described with respect to the jack on the wheel 11.

With the jack so applied to the wheel 11b it will be seen that lug 28 will be disposed between adjacent spokes of the wheel at the inner ends thereof. With the jack in final position on the wheel 11b, it will be apparent that forward movement of the vehicle, that is movement of the vehicle toward the right in Figure 3, will cause the flat end of the jack flange to engage the ground thereby effecting a raising of the wheel 11b.

While I have mentioned that a forward movement of the vehicle will result, with the jack applied, in a raising of the wheel, it is apparent that such can also be accomplished by a reverse movement of the automobile.

While I have herein shown and described the preferred embodiment of the invention, it is to be understood that I do not wish to limit myself to the precise details of construction, combination and arrangement of elements as herein shown and described, but claim all such forms of the invention to which I am entitled in view of the requirement of the prior art and the scope of the appended claims.

Having thus described my invention, what I claim as new is:

1. A vehicle wheel raising jack comprising a base member, a web rising from said base member, a laterally extending head provided adjacent the upper end of said web, and provided with a recess, an arm provided with a lug engaging said recess, a lug having a slotted base member through which said arm extends, said lug being adapted to engage the inner ends of adjacent spokes of the wheel, and means for clamping the lug on said arm.

2. In a wheel raising jack, a base, an upright web rigidly secured to the base at an angle thereto, a head on the upper end of said web, and provided with a plurality of transversely spaced sockets in the top thereof, a load-supporting lug, and a projection carried by said lug and adapted to be engaged with a selected one of said sockets for retaining the lug on said head against lateral movement relative thereto.

3. A vehicular wheel jack comprising a base, a web extending upwardly from said base, a head on the upper end of said web, and provided in its top side with a socket, a load-engaging lug, and an arm carried by said lug and provided with means for engaging said socket for supporting the lug laterally with reference to said head.

4. In a wheel jack, a base, a web rising from the base at an angle thereto, a head on the upper end of said web, and provided in its top side with a socket, an arm provided at one end with a depending flange engaging said socket, a load-engaging lug having a base provided with an aperture extending therethrough and through which said arm extends, and means engageable with the base of said lug and said arm for securing said lug at the desired adjustment on said arm.

5. In a vehicular wheel jack, a base, a web rising from the base, a head on the upper end of said web, a load-supporting lug provided on its top side with a concaved seat for engaging a brake drum, inter-engaging means on said head and said lug whereby the lug is retained against rotative movement relative to the head but is permitted transverse movement relative to said head, and additional interengaging means on said head and said lug for securing the latter at the desired adjustment transversely of said head.

HARRY A. ELWELL.